UNITED STATES PATENT OFFICE.

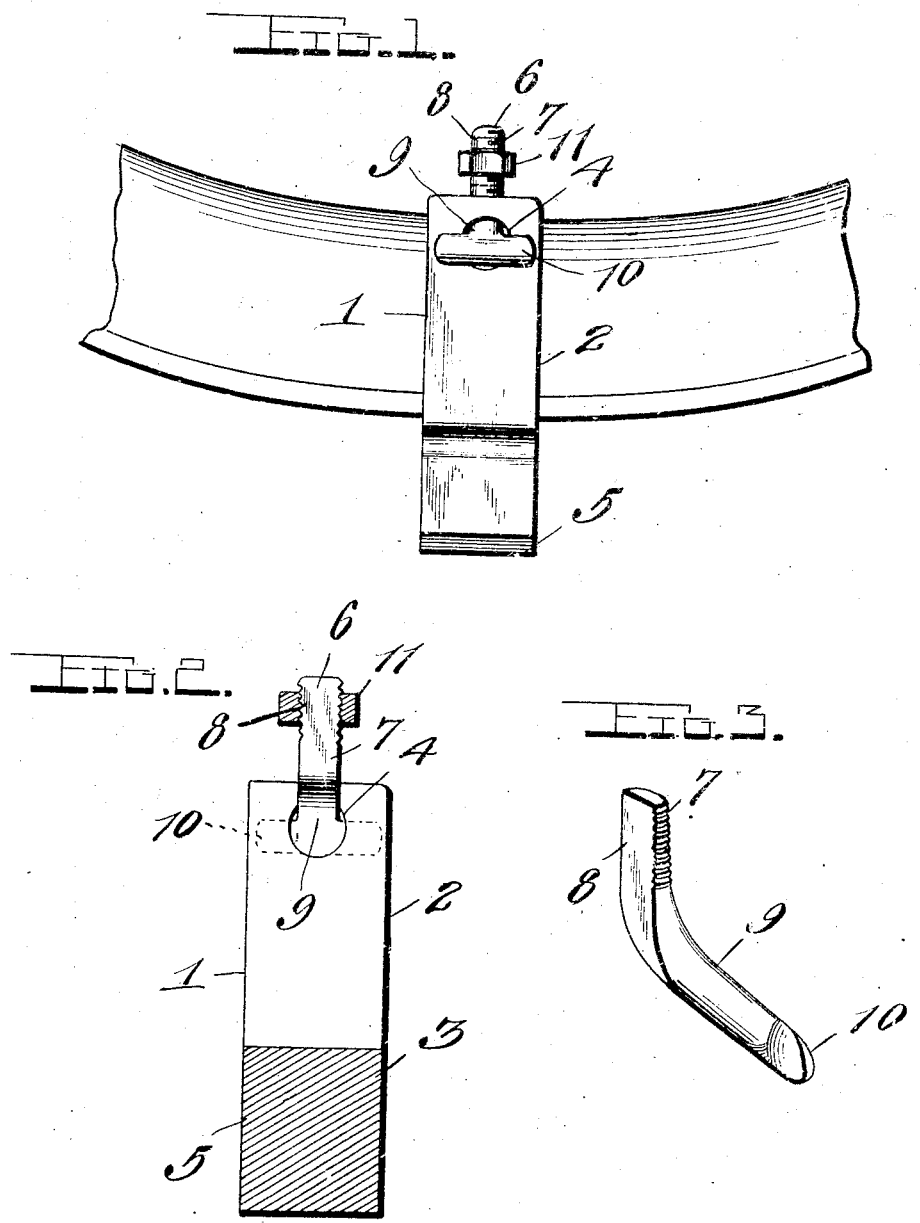

IRVIN R. THOMPSON, OF PITTSBURG, PENNSYLVANIA.

ATTACHMENT FOR WHEELS.

976,315.  Specification of Letters Patent.  Patented Nov. 22, 1910.

Application filed September 6, 1910.  Serial No. 580,515.

*To all whom it may concern:*

Be it known that I, IRVIN R. THOMPSON, a citizen of the United States, residing at Pittsburg, in the county of Allegheny and State of Pennsylvania, have invented certain new and useful Improvements in Attachments for Wheels, of which the following is a specification, reference being had to the accompanying drawings.

This invention is an improved spur attachment for use on the wheels of vehicles and especially on the traction and driving wheels of automobile vehicles to prevent the same from slipping on ice or snow, the object of the invention being to provide an improved form of spur attachment which may be readily applied to or detached from the rim of a wheel and to combine with the spur attachment means for securing the same in place on the wheel and for permitting the ready removal thereof from the wheels, the invention consisting in the construction, combination and arrangement of devices hereinafter described and claimed.

In the accompanying drawings,—Figure 1 is an elevation of a portion of the rim of a wheel provided with one of my improved spur attachments. Fig. 2 is a transverse sectional view of the same. Fig. 3 is a detail perspective view of one member of the split bolt.

In accordance with my invention I provide a clip or yoke 1 which is preferably made of iron or steel; is substantially U-shaped and comprises a pair of arms 2 and a base 3 to which they are united. The said clip or yoke is adapted to be fitted radially on the ring or tire of a wheel so as to dispose the arms 2 of the clip or yoke on opposite sides of the wheel rim. The said arms are provided at their inner ends with openings 4. At the outer end of the clip or yoke is a spur 5 which may, in practice, be formed integrally therewith or may be formed separately therefrom and welded thereto. The said spur is disposed medially with relation to the base or outer end of the clip or yoke and is adapted to engage an icy or other slippery surface and hence prevent slipping of the wheel, it being understood that the wheel will be provided with a suitable number of my improved spur attachments.

In connection with each of my improved spur attachments I employ a split bolt 6 which comprises a pair of separable stem members 7, each of which has a straight threaded portion 8 and a curved portion 9. The curved portions 9 are cylindrical in form; the straight portions 8 are semi-cylindrical in form and their flat sides are opposed and in mutual contact so that the said split bolt forms a fork, the curved portions or arms 9 of which are, in practice, passed through the openings in the sides of the clip or yoke and are provided at their outer ends with heads 10 which bear on the outer sides of said arms. It will be observed and understood that the split bolt is thus disposed with its curved fork arms on the inner side of the rim of the wheel and with its straight portion 7 disposed radially, the said straight portion, comprising the split, being detachably semi-cylindrical. The members 8 are engaged and connected together by a nut 11 which is screwed thereon and serves to clamp the members of the split bolt together so as to firmly unite them and cause the said split bolt to coact with the clip or yoke and firmly engaging the wheel rim and tire so that my improved spur attachment, when applied to a wheel, is secured very firmly thereon by merely setting up the nut 11.

In order to release the spur attachment from the wheel it is only necessary to take off the nut, separately withdraw the members of the split bolt from the clip or yoke and then remove the latter.

Having thus described my invention, what I claim is:—

1. A detachable spur for wheels having a substantially U-shaped clip provided in its sides with openings, in combination with a split bolt, the members of which are inserted through and engaged with the said openings, and a nut screwed on the threaded portion of the said split bolt and securing the members thereof together and causing said split bolt to coact with the said yoke in engaging the rim of a wheel and securing the spur detachably thereto.

2. A wheel attachment of the class described comprising a substantially U-shaped clip having a spur at its outer end, each of the arms of said clip being provided near its inner end with an opening, a split bolt having its members curved longitudinally, each of said members being provided at one end with a head to bear against the outer side of one of the arms of the clips, said members being adapted to be passed through the openings in said clip arms, and said members being provided with screw threads at the ends opposite the heads, and a nut to engage the screw threaded portions of said split bolt and clamp the said portions or members thereof together.

In testimony whereof I hereunto affix my signature in the presence of two witnesses.

IRVIN R. THOMPSON.

Witnesses:
 MAX H. SROLOVITZ,
 R. PAULIN.